(12) United States Patent
Albalat Perez et al.

(10) Patent No.: US 7,985,789 B2
(45) Date of Patent: Jul. 26, 2011

(54) AQUEOUS SILICA-BASED NANOCOMPOSITE POLYMER DISPERSION

(75) Inventors: Jordi Albalat Perez, Barcelona (ES); Carme Font i Panades, Sant Quirze del Valles (ES); Jean-Yves Loze, Pontpoint (FR)

(73) Assignee: Cray Valley S.A., Courbevoie (FR)

( * ) Notice: Subject to any disclaimer, the term of this patent is extended or adjusted under 35 U.S.C. 154(b) by 432 days.

(21) Appl. No.: 12/280,861

(22) PCT Filed: Feb. 22, 2007

(86) PCT No.: PCT/EP2007/001526
§ 371 (c)(1),
(2), (4) Date: Jan. 11, 2009

(87) PCT Pub. No.: WO2007/096159
PCT Pub. Date: Aug. 30, 2007

(65) Prior Publication Data
US 2009/0318598 A1    Dec. 24, 2009

(30) Foreign Application Priority Data
Feb. 27, 2006  (FR) ...................................... 06 01991

(51) Int. Cl.
*C08K 5/24*  (2006.01)
*C08K 3/34*  (2006.01)
*C08F 2/22*  (2006.01)
*C09D 7/12*  (2006.01)
*C09D 11/00*  (2006.01)
*C09J 1/00*  (2006.01)

(52) U.S. Cl. ........ 524/261; 524/444; 524/495; 524/493; 524/420; 524/789; 523/205; 523/333

(58) Field of Classification Search ................ 524/261, 524/444, 493, 495, 420, 779, 789; 523/205, 523/333
See application file for complete search history.

(56) References Cited

U.S. PATENT DOCUMENTS

| | | | |
|---|---|---|---|
| 6,756,437 B1 | 6/2004 | Xue et al. | |
| 6,833,401 B1 | 12/2004 | Xue et al. | |
| 7,094,830 B2 * | 8/2006 | Xue et al. | 524/779 |
| 7,544,726 B2 * | 6/2009 | Greenwood | 523/212 |
| 2004/0171728 A1 | 9/2004 | Xue et al. | |
| 2006/0144290 A1 | 7/2006 | Polk et al. | |

FOREIGN PATENT DOCUMENTS

| | | |
|---|---|---|
| WO | WO 03000760 A1 * | 12/2003 |
| WO | 2004035473 A1 | 4/2004 |
| WO | 2004035474 A1 | 4/2004 |
| WO | WO 2004035473 A1 * | 4/2004 |

* cited by examiner

*Primary Examiner* — Michael M Bernshteyn
(74) *Attorney, Agent, or Firm* — Whyte Hirschbocek Dudek SC (57) ABSTRACT

The invention concerns an aqueous specific silica-based nanocomposite polymer dispersion, a method for preparing same, a coating composition, in particular protective, containing said dispersion, for applications requiring high anticorrosive, anti-abrasive and chemical resistance performances. It concerns an aqueous nanocomposite polymer dispersion obtainable by an emulsion polymerization process of at least one monomer composition in the presence of at least one aqueous silica nanoparticle dispersion, said monomer composition being added at least in one step into the reactor already containing the aqueous silica nanoparticle dispersion, said aqueous silica nanoparticle dispersion having an anionic character and being stable in a pH range between 2 to 10, and said emulsion polymerization being performed in the presence of at least one organic initiator free of any ionic group and in the absence of any monomer or cationic dispersant.

29 Claims, 6 Drawing Sheets

AQUEOUS SILICA-BASED NANOCOMPOSITE POLYMER DISPERSION

The present invention relates to an aqueous dispersion or a specific silica-based nanocomposite polymer, to its process of preparation and to a coating composition, in particular a protective coating composition, comprising said dispersion for applications requiring high corrosion-inhibiting, abrasion-inhibiting and chemical resistance performances.

More particularly, this aqueous dispersion according to the invention is based on an organic polymer and on nanoparticulate silica, said polymer being obtained by emulsion polymerization of a mixture of monomers in the presence of an aqueous dispersion of a specific nanosilica, stable at a pH range extending from 2 to 10, and said dispersion being devoid of any silane surface treatment.

In point of fact, an important problem to be solved in the preparation of a "hybrid" aqueous dispersion, such as that of the invention based on a polymer and a nanosilica, is the stability of said hybrid aqueous dispersion, in order to avoid any risk of agglomeration or of gelling, either under the emulsion polymerization conditions or under the conditions of storage or of final use of said dispersion. The known solutions of the prior art are essentially based either on the pretreatment of the silica particles with a silane-type coupling agent, which presents problems of cost, of handling and of an additional stage, or on the use of monomers or initiators or dispersants (stabilizers) having a cationic nature; however, in this case, the final dispersion obtained is stable only within a limited pH rage (basic).

WO 01/029106 describes the preparation of aqueous dispersions of particles composed of a polymer and of finely divided inorganic solid particles. The final product is obtain red by radical polymerization of the mixture of monomers in the presence of silica. The mixture of monomers comprises at least one amino, amido, ureido or N-heterocyclic group in the case where the dispersed inorganic particles have an electrophoretic mobility with a negative sign.

WO 03/0007660 also describes such a process in the presence of a least one anionic, cationic and nonionic dispersant.

The stabilization of the silica nanoparticles by cationic monomers, initiators or dispersants generally takes place more readily in a basic pH range. In contrast, it is difficult to obtain this stabilization at neutral or acidic pH as the interaction of these substances with the surface of the negatively charged silica particles remains inadequate. Specifically, it is important to note that the medium most commonly used for carrying out an emulsion polymerization is an acidic medium since it results in higher conversions of monomers than in a basic medium.

WO 01/01008 describes a similar process in which the initiator has an electric charge with at sign opposed to the electrophoretic mobility of the dispersed inorganic particles. When the dispersed particles are anionic, the initiator is cationic, with the disadvantages described above.

WO 04/035473 and WO 04/035474 describe a process for the preparation of a stable aqueous dispersion comprising a mixture of at least one silane compound and of particles of colloidal silica in order to form silanized colloidal particles, the silanized particles being mixed with an organic binder in order to form a stable aqueous dispersion.

The use of silane coupling agents requires a two-stage process:
the silanization of the colloidal dispersion of the silica nanoparticles,
the mixing of the silanized dispersion of silica with a dispersion of organic polymer.

Such, a process results in a lower level of solid than that of the present invention, according to an "in situ" polymerization process.

The present invention overcomes the inadequacies and disadvantages of the state of the art relating to this problem by providing a "hybrid" aqueous dispersion of specific nanocomposite polymer for coatings, in particles protective coatings, or for applications requiring high performances in terms of corrosion-inhibiting effect and/or abrasion-inhibiting effect and/or chemical resistance, with a better compromise in operating performances. Already, without use of silanized silica, the present invention, by the specific choice of the silica dispersion (stable in a pH range from 2 to 10), of the initiator system and of the polymerization process involved, results in a final "hybrid" dispersion which is stable during and after the polymerization, on storage or under the final applicative operating conditions, in a broad pH range (acidic to basic, including neutral), in the absence of aggregates or agglomerates and with perfect homogeneity.

The aqueous dispersion of specific nanocomposite polymer according to the present invention is particularly suitable for the preparation of protective coatings which satisfactorily correspond to the following needs and requirements:
good mechanical performance and in particular good hardness by virtue of an increase in the overall density of crosslinking,
good hardness/flexibility compromise: the hardness increases while retaining a satisfactory flexibility,
high thermal stability flame resistance, chemical resistance and abrasion resistance,
good barrier effect to various agents and to UV radiation,
good adhesion to various substrates and more particularly to glass,
stabilizing effect of the silica particles, making possible reduced use of surfactants,
good compatibility between the polymer and the nanosilica particles, resulting in a hybrid film which is transparent and macroscopically homogeneous,
good stiffness of the film,
good stability of the coating formulations with good homogeneity and absence of any gelling during storage or use,
economic advantages, the nanosilica particles not requiring stage of additional treatment with a coupling/chemical interface agent which presents problems of cost and handling.

The present invention uses a preparation process, without a stage of treatment of the nanosilica, by an emulsion polymerization of a mixture of monomers having a predominant hydrophobic nature in the presence of a specific aqueous dispersion of nanosilica (or silica nanoparticles) having a exclusively anionic nature, which silica has not been subjected to any treatment with silane coupling agents, the aqueous silica dispersion not comprising any cationic monomer or initiator or dispersant which can function as stabilizer of said dispersion and said aqueous silica dispersion being stable in a pH range extending from 2 to 10.

In comparison with the dispersions of the prior state of the art, the hybrid aqueous dispersions according to the present invention exhibit the essential advantage of being stable (absence of gelling or of aggregates or sedimentation) during polymerization, storage or use, without having to use special coupling agents or cationic monomers, initiators or dispersants which present problems of additional cost and complex procedure.

The first subject matter of the present invention is an aqueous dispersion of nanocomposite polymer (also subsequently known as hybrid aqueous dispersion) which can be obtained by emulsion polymerization of at least one monomer composition in the presence of at least one aqueous nanosilica dispersion (or aqueous dispersion of silica nanoparticles), characterized essentially by the specificity of the aqueous dispersion or silica nanoparticles and by the initiator system used.

A second subject matter of the invention is a process for the preparation of said dispersion.

Another subject matter according to the invention is a coating composition comprising at least one aqueous polymer dispersion according to the invention.

A final subject matter according to the invention is related to the use of said dispersion in coating compositions, in particular for paints varnishes, inks or adhesives, or to the use as water-dispersible nanocomposite polymer seed in the preparation of specific structured latexes.

Thus, the first subject matter of the invention is a hybrid aqueous nanocomposite polymer dispersion obtained by emulsion polymerization of at least one monomer composition in the presence of at least one aqueous nanosilica dispersion (or aqueous dispersion of silica nanoparticles),
- said monomer composition being added, in at least one stage, to the reactor already comprising the aqueous dispersion of silica nanoparticles which is devoid of any cationic organic compound from monomers or dispersants or initiators which can function as stabilizers of said silica nanoparticles,
- said dispersion of silica nanoparticles being:
  - based on anionic particles of nanosilica devoid of any coupling agent and preferably modified with aluminum, and
  - stable in a pH range extending from 2 to 10, which stability is expressed in terms of absence of aggregates and/or agglomerates and/or sedimentation, and
- said emulsion polymerization being carried out in the presence of at least one organic initiator system free from any ionic group and in the absence of any cationic monomer or initiator of dispersant.

The expression "at least one initiator system free from any ionic group" means that the initiator system "in its entirety" is free from any ionic group.

The stability of the dispersion of silica nanoparticles throughout the pH range from 2 to 10 (this means stable at any pH in this range) can also be evaluated by the absence of gelling and more particularly by the absence of an increase in viscosity of more than 10% with respect to the initial value after at least 96 h at ambient temperature (23° C.) US 2005/0020746 describes, sections 63 to 67, a specific test suitable for such an evaluation (see results Tables 1 and 2 of this document).

Preferably, the polymerization reaction mixture (silica nanoparticles+monomers) is stable during and after the polymerization in terms of absence of gelling or of agglomerates or sedimentation.

The monomers which may be suitable for the emulsion polymerization are added in at least one stage to the reactor and can be mixtures of monomers chosen from the monomers usual in emulsion polymerization, such as acrylic ((meth)acrylic ester), vinyl, allyl or vinylaromatic monomers. This composition can comprise:
- functional monomers comprising:
  - a carboxyl group, such as (meth)acrylic acid, itaconic acid, crotonic acid, maleic acid, fumaric acid or vinylbenzoic acid, or
  - an amido group, such as (meth)acrylamide or 1-methacrylamido-2-imidazolidinone)ethane,
  - a nitrile group, such as (meth)acrylonitrile,
  - hydroxyl group, such as hydroxyalkyl(meth)acrylates,
  - a ureido group, such as methacrylamideethyl-ethylene urea or ethylimidazolione methacrylate,
  - a sulfonate group, such as derivatives of 2-acrylamido-2-methylpropanesulfonic acid
- polyansaturated monomers as internal (intraparticulate) crosslinking agents, such as: alkylene glycol di(meth)acrylates, or
- monomers which are precursors of crosslinking (auto or non-auto) in photopolymerization, such as diacetone acrylamide (DAAM) or diacetone methacrylamide, or
- (meth)acrylates carrying acetoacetoxy groups, such as acetoacetoxyethyl(meth)acrylate, or
- monomers carrying hydrolyzable blocked (alkoxy) silane groups (silane monomers) which are precursors of autocrosslinking during film formation.

In the case of monomers which are precursors of crosslinking, in particular in the case of (meth)acrylate monomers carrying acetoacetoxy groups, the crosslinking and the crosslinking density increase with these monomers and the mechanical performances (hardness, modulus and chemical resistance) and the wet adhesion are then found to be further improved significantly.

Said functional monomers can be present in a proportion varying from 0 to 5% by weight, with respect to the total of the monomers, except in the more particular case of the monomers comprising an acetoacetoxy group, such as acetoacetoxyethyl(meth)acrylate, which can be present at up to 30% by weight.

In the case where the functional monomers are silane monomers, in this case the level can vary between 0 and 2% and preferably from 0.01 to 1%, with respect to the total of monomers. The presence of monomers of this type (silane-comprising) makes it possible to significantly reduce the permeability to water of the final coating obtained, more particularly for protective coating applications for wood and derived products.

The hybrid aqueous dispersion can comprise, in addition to the nanocomposite polymer, polyfunctional (meth)acrylates which render it photocrosslinkable. Mention may be made, as polyfunctional (meth)acrylates, of di-, tri- or tetrafunctionalized ethoxylated or propoxylated (meth)acrylates, such as ethoxylated trimethylolpropane triacrylate (Sartomer® SR 454), ethoxylated pentaerythritol tetraacrylate (Sartomer® SR 494), propoxylated trimethylolpropane triacrylate (Sartomer® SR 492) or propoxylated glycerol triacrylate (Sartomer® SR 9020).

According to a specific alternative form of the invention, said monomer composition can be added to the reactor in at least two stages, it being possible for the monomer composition of the 1st stage to be different from the monomer composition of the 2nd stage. Preferably, said composition can be chosen so as to obtain structured particles of nanocomposite polymer and more particularly particles having a core/shell structure. The proportions between the core and the shell vary from 50/50 so to 90/10 per 100 parts by weight of monomers. The Tg of each of the core and shell phases depends on the morphology and/or properties desired and varies between −40° C. and 150° C. and preferably between −25° C. and 105° C. More particularly, the core/shell structured particles exhibit a hard core (high Tg) and soft shell (low Tg).

The final size of the particles of the aqueous dispersion of nanocomposite polymer of the invention can vary from 50 to 500 nm and preferably from 70 to 150 nm, with an overall solids content ($SiO_2$+polymer) of said dispersion which can vary from 10 to 65% by weight and preferably from 35 to 50% by weight.

The ratio by weight of the silica to the overall solids content ($SiO_2$/($SiO_2$+polymer)) can vary from 0.1 to 60% and preferably from 3 to 40%.

The final solids content of the polymer can vary from 35 to 70% by weight and preferably from 40 to 60% by weight.

According to a preferred alternative form of the invention, a specific aqueous dispersion of nanocomposite polymer can be obtained by using, as seed at the start of the 1st polymerization stage, at least one different aqueous polymer dispersion. More particularly, this different aqueous polymer dispersion can be chosen from the aqueous dispersions of nanocomposite polymer as are defined according to the invention.

The polymer seed of the 1st stage can comprise from 0 to 50% by weight of silica nanoparticles.

The polymer seed of the 1st stage can constitute from 0 to 40% by weight of the final polymer.

Aqueous dispersions of nanosilica (or aqueous dispersions of silica nanoparticles) suitable for the present invention are not treated with silane-type coupling agents and the aqueous dispersion which result therefrom do not comprise any organic compound having at cationic nature from monomers or dispersants or initiators which can function as stabilizer of said silica dispersions and said dispersions are stable in terms of gelling or absence of aggregates and/or agglomerates and/or sedimentation during the reaction or during storage or use.

The size of the silica nanoparticles in the aqueous silica dispersion according to the invention can vary from 5 to 50 nm and preferably from 5 to 30 nm. This size is a mean which refers to an indirect measurement method, via the method of the measurement of the specific surface (according to the BET method), but measurements by the PCS method (see in the experimental part) or by transmission electron microscopy (TEM) can also confirm such a mean size in these size ranges.

More particularly, said aqueous dispersion of silica nanoparticles can be based on nanosilica modified with aluminum.

The nanoparticles of aluminum-modified silica have an $SiO_2/Al_2O_3$ ratio by weight which can vary from 80/1 to approximately 240/1, preferably, from 120/1 to 220/1 and more preferably still from 140/1 to 180/1.

The modification or said silica nanoparticles with aluminum corresponds to the stabilization of the $SiO_2$, dispersion with sodium aluminate instead of sodium hydroxide. The aqueous dispersion of nanoparticles of silica modified with aluminum is prepared by modification of the surface of silicic acid with aluminate ions, which is possible under certain conditions, aluminum and silica having a coordination number of 4- or 6 with respect to oxygen, and aluminum and silica having approximately the same atomic diameter. The aluminate ion $Al(OH)_4^-$ is geometrically identical to $Si(OH)_4$, it being possible for the ion to be inserted or substituted at the surface of $SiO_2$ and the aluminum silicate obtained having a fixed negative charge. Such an aqueous dispersion of nanoparticles of silica modified with aluminum is more stable with regard to the formation or a gel than an aqueous dispersion of nanoparticles of unmodified silica which can gel rapidly and which is less sensitive to salts.

Aqueous dispersions of silica nanoparticles which are stable in a pH range extending from 2 to 10 can be obtained by other processes which are different from the process for modification with aluminum. Mention may be made as examples of such products, of Snowtex® O and Snowtex® N from Nissan Chemical, and these products are silicas with silica nanoparticles carrying a negative charge (anionic silica nanoparticles) having the majority of the acid (Si—OH) sites neutralized, for example with sodium or ammonium.

The silica nanoparticles can be attached via chemical bonds to the polymer particles.

The aluminum-modified nanosilica particles used (modified at the surface of the nanoparticle) can be silica nanoparticles originating from colloidal suspensions, such as Ludox® AM, Ludox® TMA, Ludox® SK or Ludox® SK-G from Grace Davison or such as Bindzil® 305/220 FG from Eka Chemicals or such as Levasil 200A/30 from HC. Starck (Bayer) or Snowtex® C from Nissan Chemical.

According to an alternative form of the invention, the ratio by weight of the silica nanoparticles to the overall solids content (total silica+dry polymer) varies from 0.1 to 60% and preferably from 3 to 40%. The presence of 3 to 5% by weight of silica nanoparticles is sufficient to observe a stabilization of the polymer particles and an improvement in the mechanical performances, such as the hardness. The mechanical performances are significantly better for a ratio by weight of silica nanoparticles ranging from 5 to 60%.

The aqueous dispersion of nanocomposite polymer can also comprise surface-active agents.

Mention may be made, as nonionic surface-active agents, of polyethers, such as ethylene oxide and propylene oxide condensates alkyl ethers and thioethers, alkylaryl glycol polyethylenes and alkylaryl glycol polypropylenes, ethylene oxide derivatives of long-chain fatty acids, condensates of ethylene oxide with higher alkyl mercaptans, or ethylene oxide derivatives of long-chain alcohols and carboxylic acids. These nonionic surfactants preferably comprise approximately 10 to 100 oxyethylene units per molecule and more preferably still approximately 30 to 50 oxyethylene units.

Mention may be made, as anionic surface-active agents, of $C_8$-$C_{36}$ fatty alcohols, such as those of stearyl and lauryl, preferably alkoxylated and more particularly ethoxylated with 1 to 50 oxyethylene units per molecule, sulfonated derivatives of fatty alcohol, sulfates and/or sulfonates (sodium or ammonium), derivatives of sulfosuccinic acid (sodium or ammonium salts), or esters or hemiesters of fatty alcohol which can be ethoxylated or not.

The monomers employed according to the present invention, and the proportions, will be chosen according to the Tg targeted and also according to the properties which it is desired to confer on the polymer, such as hydrophobicity.

The Tg of a polymer can be estimated by Fox's law:

$$1/Tg = wa/Tga + wb/Tgb + \ldots$$

wa and wb being the fractions by weight of the monomers a and b,

Tga and Tgb being the Tg quantities of the corresponding homopolymers and their values being drawn from the literature, such as the Polymer Handbook, 3rd edition, 1989.

In the case of core/shell structured particles, the monomer composition of each of the phases (core or shell) is chosen according to the Tg desired for each of these phases. Preferably, the core/shell structured particles exhibit a hard core (high Tg) and a soft shell (low Tg).

In the case of a soft phase, the Tg of the corresponding phase can generally be less than or equal to 20° C. and more particularly lie between −40° C. and 20° C. and preferably be less than or equal to 0° C. and more particularly lie between −30° C. and 0° C.

In the case of a soft phase, the corresponding monomer composition comprises, as preferred monomers, at least one monomer chosen from ethyl acetate, butyl acrylate and 2-ethylhexyl acrylate.

In the case of a hard phase, the Tg of the corresponding phase can generally be greater than or equal to 30° C. and more particularly lie between 30° C. and 150° C. and preferably be greater than or equal to 50° C. and more particularly lie between 50° C. and 130° C.

In the case of a hard phase, the corresponding monomer composition comprises, as preferred monomers, at least one monomer chosen from styrene and methyl methacrylate.

The monomers which can be used are monomers having at least one unsaturated ethylenic group and more particularly those which can polymerize with free radicals.

Mention may be made, as preferred (meth)acrylic esters, of methyl acrylate, ethyl acetate, n-butyl acrylate, tert-butyl acrylate, 2-ethylhexyl acrylate, methyl methacrylate, butyl methacrylate, 2-hydroxyethyl acrylate and 2-hydroxypropyl acrylate.

Mention may be made, as preferred vinylaromatic monomers, of styrene and its derivatives, including vinyltoluenes.

Mention may be made, as preferred polyunsaturated monomers used as internal crosslinking agents, of (meth)acrylic esters having at least two nonconjugated unsaturated ethylenic double bonds, such as alkylene glycol di(meth)acrylates, for example ethylene glycol di(meth)acrylate, 1,2-propylene glycol di(meth)-acrylate, 1,3-propylene glycol di(meth)acrylate, 1,3-butylene glycol di(meth)acrylate, 1,4-butylene glycol diacrylate or 1,6-hexanediol di(meth)acrylate. Mention may also be made of other polyunsaturated monomers such as allyl(meth)acrylate, diallyl fumarate, triallyl cyanurate, divinylbenzene and vinyl (meth)acrylate.

Mention may be made, as monomers which can be used as precursors of postpolymerization crosslinking (autocrosslinking or non-autocrosslinking), for example of diacetone acrylamide (DAAM), diacetone methacrylamide, 2-butanone (meth)acrylamide, vinyl acetoacetate and acetoacetoxyethyl(meth)acrylate and, as monomers having silane groups (silane monomers), those from vinyltrialkoxysilanes, such as vinyl-trimethoxysilane, or from alkylvinyldialkoxysilanes, acryloyloxyalkyltrialkoxysilanes or methacryloyloxy-alkyltrialkoxysilanes, such as acryloyloxyethyltrimethoxysilane, methacyloxyethyltrimethoxysilane, acryloyloxypropyltrimethoxysilane or methacryloyloxypropyl trimethoxysilane.

More particularly, the composition of the monomers can comprise acetoacetoxyethyl methacrylate (AAEM) at up to 50% by weight and preferably from 0.1 to 25% by weight with respect to the total of the monomers. The presence of this type of monomer improves the mechanical strength of the final film, with a significant increase in the mechanical modulus and in other related performances: inter alia improved hardness and improved resistance to blocking.

Mention may be made, as short-chain or α,β-unsaturated mono- or polycarboxylic acids, of acrylic acid, methacrylic acid, itaconic acid, crotonic acid, maleic acid, fumaric acid and vinylbenzoic acid.

Mention may be made, as chain-transfer agents, of linear or branched alkyl mercaptans and of mercaptocarboxylic acids having from 2 to 8 carbon atoms, and their esters, such as mercaptoacetic acid, 2-mercaptopropionic acid, 3-mercaptopropionic acid, 2-mercaptobenzoic acid, mercaptosuccinic acid, mercaptoisophthalic acid and their alkyl esters.

Mention may be made, as preferred chain-transfer agents, of the esters of a mercaptomonocarboxylic acid and/or of a mercaptodicarboxylic acid having from 2 to 6 carbon atoms, more particularly the alkyl esters of a mercaptopropionic acid, more preferably the isooctyl or n-dodecyl esters of mercaptopropionic acid, or n-dodecyl mercaptan.

Suitable initiators according to the invention can comprise at least one polymerization free radical. The amount of initiator comprising a polymerization free radical can vary from 0.1 to 3% by weight, with respect to the total amount of monomers to be polymerized. The initiators comprising a polymerization free radical can also be introduced with an activator as initial charge of the reaction medium and the remaining amount can be added continuously or batchwise during the polymerization.

Mention may be made, as preferred initiators, of nonionic peroxides, such as organic peroxides, for example alkyl hydroperoxides, such as tert-butyl hydroperoxide (TBHP) and azo initiators, for example 2,2'-azobisisobutyronitrile or 2,2'-azobis[2-methyl-N-(2-hydroxyethyl)propionamide].

Suitable initiators used have a halflife which is not less than 10 hours at 50° C. and preferably which is not less than 10 hours at 85° C.

Mention may be made, as preferred activators, of ascorbic acid, erythorbic acid or acetic sulfinic acid derivatives, such as sodium formaldehydesulfoxylate (Rongalite® C from Solvadis or Hydrosulfite® AWC from Cognis) and its compositions, such as Bruggolite® FF6 from Brüggemann Chemical.

(Meth) acrylate polyfunctional oligomers and/or monomers (PFA) can be mixed with the dispersion of the invention so as to obtain a photocrosslinkable latex. Mention may be made, as suitable polyfunctional (meth)acrylate oligomers, of ethoxylated and propoxylated polyglycol acrylate derivatives, bisphenol diacrylates neopentyl glycol diacrylates, trimethylolpropane triacrylates, pentaerythritol tetra- and pentaacrylates or polyfunctional monomers, such as di-, tri- and tetraacrylates of polyethylene or polypropylene glycol or oligomers of acrylates of polyester, or of epoxy, or of urethane. More particularly, in this case, the polymer of said dispersion comprises free acetoacetoxy groups. This makes it possible to have a precrosslinked film, after film formation and before crosslinking under radiation (UV or electron beam), by an addition reaction of the acetoacetoxy group with the (meth)acrylate, preferably polyfunctional acrylate (PFA). This results in a better chemical, mechanical and thermal behavior of the final film obtained but also in an improvement in the resistance to blocking, before subjecting it to crosslinking under radiation in order to obtain additional crosslinking. The twofold crosslinking in postpolymerization results in a film with a better mechanical behavior, an improved chemical resistance, hardness, abrasion resistance and thermal behavior, and a reduced level or residual monomers by reactive consumption with the acetoacetoxy groups.

Said dispersion can be further modified according to a more specific form by postaddition (after emulsion polymerization) of at least one organosilane compound. Mention may be made, as examples of suitable organosilane compounds, of: octyltriethoxysilane, octyltrimethoxysilane, ethyltrimethoxysilane, propyltriethoxysilane, phenyltrimethoxysilane, isobutyltriethoxysilane, glycidoxypropyltrimethoxysilane, glycidoxypropymethyldiethoxysilane, ureidopropyltrimethoxysilane, cyclohexyltrimethoxysilane, cyclohexyltriethoxysilane, dimethyldimethooxysilane, chloropropyltriethoxysilane, trimethylethyoxysilane, phenyldimethylethoxysilane, hexamethyldisiloxane, trimethylsilyl chloride, hexamethyldisilizane, methyltriethoxysilane, methyltrimethoxysilane, hexyltrimethoxysilane, isocyanate silanes, such as tris(3-trimethoxysilyl)propyl isocyanurate, γ-mercaptopropyltrimethoxysilane), 3-mercatopropyltriethoxysilane, bis(3-(triethoxysilyl)propyl) polysulfide, silanes with an epoxy group and/or silanes with a glycidoxy and/or glycidoxypropyl group, such as γ-glycidoxypropyltrimethoxysilane and/or γ-glycidoxypropylmethyldiethoxysilane, 3-glycidoxypropylhexyltrimethoxysilane, β-(3,4-epxoycyclohexyl) ethyltrimethoxysilane, silanes with a vinyl group, such as vinyltriethoxysilane, vinyltrimethoxysilane, vinyltris-(2-methoxyethoxy)silane, vinylmethyldimethoxysilane or vinyltriisopropoxysilane, γ-methacryloyloxypropyltrimethoxysilane, γ-methacryloyloxypropyltriethoxysilane or γ-methacryloyloxypropyltriisopropoxysilane.

The advantage of these compounds is based on the fact that these silane compounds make possible the grafting of the silane compound to the surface of the silica nanoparticle by a condensation reaction and/or by an interaction (H bond) with the surface Si—OH groups specific to the nanosilica (formation of covalent bonds with the nanosilica or of H bonds with the surface of the nanosilica). This grafting or H bonding makes it possible finally to partially modify this surface of the nanoparticle and to confer a more hydrophobic character on it.

As a consequence of this very partial modification, the final coating is significantly more resistant to water permeability (controlled impermeability). This specific performance is very important for protective coating applications for wood or wood-derived products. The suitable level of said functional or ogranosilane compounds for such a modification can range up to 10 mmol of said compound per gram of nanosilica (in the dry state) and more particularly from 0.01 to 2.5 mmol per g of nanosilica (dry state).

The polymerization temperature required to synthesize the aqueous dispersions according to the invention, both for the main polymerization stage and for the additional polymerization stage, can vary from approximately 40° C. to approximately 90° C. and preferably from approximately 55° C. approximately 85° C. depending on the polymerization time planned for and the type of initiator or activator used.

The duration of the polymerization stage or stages can vary from approximately 30 minutes to approximately 8 hours and preferably from approximately 60 minutes to approximately 4 hours.

The second subject matter of the invention is a specific process for the preparation of the aqueous dispersion of nanocomposite polymer according to the invention as defined above. This dispersion can be obtained by a process comprising at least the following stages:
i) addition, to a polymerization reactor, of at least one dispersion or silica nanoparticles exhibiting an anionic nature which is stable in a pH range extending from 2 to 10, said nanosilica preferably being modified with aluminum,
ii) continuous or semicontinuous addition of a monomer composition in at least one stage.
iii) polymerization of the reaction mixture resulting from stages i) and ii) in the presence of at least one organic initiator system free from any ionic group, it being possible for said initiator system to be added with the monomer composition or separately.

The aqueous dispersion of silica nanoparticles added during stage i) can be devoid of any organic compound having a cationic nature chosen from monomers or dispersants or initiators which can function as stabilizer of said aqueous dispersion of silica nanoparticles.

Preferably, the polymerization reaction mixture resulting from stage iii) is stable, during and after the polymerization, in terms of absence of gelling.

Each addition stage ii) and polymerization stage iii) can comprise least 2 stages, it being possible for the monomer composition of the 1st stage to be different from the monomer composition of the 2nd stage.

More particularly, the monomer composition added during stage ii) is chosen in order to obtain structured particles of nanocomposite polymer preferably having a core/shell structure.

Said process, according to a specific alternative form of the invention, can comprise an additional stage consisting of the use of at least one aqueous polymer dispersion as seed, before the additional of said monomer composition, it being possible for said aqueous polymer dispersion which can be used as seed to be an aqueous dispersion of nanocomposite polymer as defined according to the present invention.

According to an alternative form of the process for the preparation of a dispersion according to the invention, said process comprises an additional stage of postaddition (after the emulsion polymerization stage) of at least one functional organosilane compound as defined above according to the general formula (I) at a level ranging up to 10 mmol more preferably from 0.01 to 2.5 mmol per g of nanosilica (dry state).

Another subject matter of the present invention is a coating composition and more particularly a protective coating composition for applications requiring high corrosion-inhibiting and/or abrasion-inhibiting and/or chemical resistance performances, comprising at least one dispersion as defined according to the invention or prepared according to the process as defined according to the invention.

More particularly, such a coating composition is selected from paints or varnishes or inks or adhesives.

The coating compositions according to the invention can comprise additives known to a person skilled in the art. Mention may be made, as examples of additives, of fillers, pigments, dyes, antifoaming agents, degassing agents, thickeners, thixotropic agents, leveling agents, plasticizers or UV absorbers.

The substrates suitable for these coatings are wood, metal surfaces, such as steel or aluminum, plastic films, such as polyester, PET, polyolefins, polyamide, polycarbonates, ABS or styrene, woven or nonwoven textiles, bricks, paper and its equivalents, ceramics, stone, cement materials, asphalt, fibers, glass, porcelain and leather. A specific use is that of protective coating for wood or decorative coating on glass. In the case of the wood application, it is preferable to use a dispersion modified by postaddition of functional organosilane product as defined above, in order to have a significantly improved resistance to water permeability of the final coating.

Apart from the direct use as component (binder) in paints or varnishes or inks or adhesives, the aqueous dispersion of nanocomposite polymer of the invention can also act as water-dispersible nanocomposite polymer seed in the preparation of specific structured latexes.

The aqueous dispersion of nanocomposite polymer according to the invention can be dried by freezing or by spray drying, so as to obtain a powder formed of redispersible composite particles. For this specific application, it is preferable for the composite polymer to have a Tg of greater than 50° C., preferably of greater than 90° C. and more preferably still of greater than 100° C. The powders formed of redispersible composite particles can be used as a additives in coatings, plastics, inks, and the like. The minimum film formation temperature (MFFT or MFT) is preferably less than 40° C. and more preferably less than 20° C. The solids content of the dispersion (polymer+nanosilica) can vary from 30 to 60% and preferably from 40 to 55%. The final viscosity at 23° C. can vary from 5 to 10 000 and preferably in a range extending from 5 to 3000 mPa·s and remains stable for at least one month after storing at 50° C. The term "stable" is to be interpreted as meaning a variation of less than 5% with regard to the initial viscosity.

The following examples of the experimental part can illustrate the present invention without limiting its scope.

Experimental Part:

Starting Materials Used Tables 1a and 1b

TABLE 1a

Aqueous nanosilica dispersions

| Constituent | Function | Chemical nature | Supplier |
| --- | --- | --- | --- |
| Ludox ® AM | Dispersion of anionic silica nanoparticles | 30% by weight solids content, stable at a pH of 2 to 10 $SiO_2$ level = 29-31% $Al_2O_3$ level = 0.197% (see analysis method below) Size: 12 nm (method by specific surface = 228 m²/g, according to BET, and dispersion density at 20° C., $\rho = 1.2$ g/cm³), According to supplier sheet | Grace Davison |
| Bindzil ® 305/220 FG | Dispersion of anionic silica nanoparticles | 30% (SC), stable at a pH of 2 to 10, with $SiO_3$ level = 29.5-31% $Al_2O_3$: = 0.244% (see analysis method below) Size: 15 nm (method by specific surface = 220 m²/g, according to BET, and dispersion density at 20° C., $\rho = 1.2$ g/cm³), According to supplier sheet | Eka Chemicals; AB (Akzo Nobel) |
| Levasil ® 200A/30 | Dispersion of anionic silica nanoparticles | 30% SC, stable at a pH from 2 to 10 $SiO_2$ level = 30% Size: 15 nm (method by specific surface = 200 m²/g, according to BET, and dispersion density at 20° C., $\rho = 1.2$ g/cm³), According to supplier sheet $Al_2O_3$ = 0.160% (see analysis method below) | H. C. Starck (Bayer) |
| Klebosol ® 30 R12 | Dispersion of anionic silica nanoparticles | SC: 30% not stable at pH: 2-10 % $SiO_2$: 30% $Al_2O_3$: 0% (see analysis method below) Size: 12 nm (method by specific surface = 200 m²/g, according to BET, and dispersion density at 20° C., $\rho = 1.2$ g/cm³), According to supplier technical sheet | Clariant |

TABLE 1b

Monomers and other starting materials

| Constituent | Function | Chemical nature | Supplier |
| --- | --- | --- | --- |
| Methacrylic acid (MAA) | Monomer | Methacrylic acid | Arkema |
| Butyl acrylate (BuA) | Monomer | Butyl acrylate | Arkema |
| Methyl methacrylate (MMA) | Monomer | Methyl methacrylate | Arkema |
| Acetoacetoxyethyl methacrylate (AAEM) | Monomer | Acetoacetoxyethyl methacrylate | Arkema |
| Disponil ® FES 993 | Surfactant | Sodium lauryl sulfate ethoxylated with 12 EO (oxyethylene), with an SC of 30% | Cognis |
| TBHP 70 | Initiator | tert-Butyl hydroperoxide at 70% by weight in water | Arkema |
| Sodium persulfate | Initiator | Sodium persulfate | Imcequi SA |
| VA-086 | Initiator | 2,2'-Azobis[2-methyl-N-(2-hydroxyethyl)propionamide] | Wako |
| Rongalite ® C | Activator | Sodium formaldehyde-sulfoxylate | Solvadis |
| Acticide ® MBS | Preservative | 2.5% by weight of MIT (2-methyl-4-isothiazolin-3-one) 2.5% by weight of BIT (1,2-benzisothiazolin-3-one) | Thor Chemie |
| Byk ® 025 | Antifoaming agent | Silicone antifoam | Byk Chemie |
| 25% Ammonium hydroxide | Neutralizing agent | 25% solution of ammonium hydroxide in water | Barcelonesa de Drogas y Productos Quimicos |

Test Methods:

1) Level of Modification of the Nanosilica with Al

This level corresponds to the level of $Al_2O_3$ in the nanosilica, as confirmed by specific quantitative analysis of Al by emission spectrometry according to the method described below and conversion of Al to equivalent weight of $Al_2O_3$.

Method Used for Al Analysis

The aluminum was quantitatively determined by atomic emission spectrometry (ICP-AES Optima 3000DV from Perkin Elmer) after alkaline fusion.

| | Al (ppm) | $Al_2O_3$ (ppm) | % $Al_2O_3$ |
| --- | --- | --- | --- |
| Ludox AM | 1040 | 1965 | 0.197 |
| Levasil 200 A/30 | 845 | 1596 | 0.160 |
| Bindzil 305/220 FG | 1290 | 2437 | 0.244 |
| Klebosol 30 R12 | 0 | 0 | 0 |

2) Viscosity

Evaluation of the viscosity before and after aging (1 month at 50° C.) according to the standard ISO 2555, with a Brookfield RVT viscometer.

3) Solids Content

Evaluation of the solids content at 105° C. according to the standard ISO 3251.

4) Measurement of the Minimum Film Formation Temperature (MFFT)

Evaluation of the MFFT according to the standard ISO 2115, on a Rhopoint MFFT Bar 90 device.

5) Appearance of the Film with a Thickness of 100 μm on Glass

Application of a film with a nominal thickness of 100 μm and with a width of 20 mm to a clean sheet of glass using an applicator of doctor blade type. The applicator is filled with the aqueous dispersion of nanocomposite polymer of the invention and is allowed to slide over the glass sheet until a continuous film is obtained. The film is allowed to dry at ambient temperature. The appearance of the film is subsequently observed: transparency, gloss, uniformity, presence of cracks, and the like.

6) Particle Size

The mean sizes of the nanosilica particles in dispersion, unless otherwise indicated, are determined according to the method of the measurement of the specific surface by the BET method, according to the instructions of the technical sheets of the suppliers.

Principle: specific surface $(4\pi r^2)/(1.33\pi r^3)*\rho'$, with r being the radius of the particle and $\rho$ the density of the aqueous dispersion and $\rho'$ the density of said particles in the dry state. This results in the following relationship: $r(m)=3*$ (specific surface in $m^2/g)/\rho'$ (in $g/m^3$), with the following relationship between $\rho'$ and $\rho$: $\rho'=100*\rho/SC$.

The measurements according to the PCS method or by transmission electron microscopy (TEM) confirm these sizes.

Measurement by Photon Correlation Spectroscopy (PSC):

This method makes it possible to measure the diameter of the polymer+nanosilica particles (size of both accessible) and of the final nanocomposite polymer. In fact, this method makes possible the detection of the final nanocomposite polymer particles and of free silica nanoparticles with as measured result the mean size of the combination (nanocomposite polymer particles and silica nanoparticles with significantly different sizes). The presence of free silica nanoparticles implies a PCS mean which is markedly lower than that measured by the LS (laser scattering) method described below and the comparison of the results of the two methods thus makes it possible to detect the presence or absence of free silica nanoparticles in the dispersion finally obtained.

The size of the particles is measured using a Zetasizer 1000HSA device from Malvern Instrument Ltd. The sample is diluted (3 to 5 drops of emulsion 50 ml of water) in a polystyrene receptacle using water deionized through a 0.22 μm cellulose acetate filter. The size of the particles is measured at a temperature of 25° C. under an angle of measurement of 90° and at a wavelength of the laser of 633 nm.

Measurement by LS-230 Laser Particle Sizing:

This method makes it possible to measure the mean diameter (size) of the of nanocomposite polymer (polymer with silica around) alone. The size of the particles is measured using an LS-230 Beckman Coulter laser particle sizer coupled to LS32 software. The emulsion is predispersed with magnetic stirring in a 100 ml beaker (1 to 2 ml of emulsion per 100 ml of deionized water).

The optical model chosen in order to carry out the particle size analysis is:
n=1.5−0.01i, with n=optical index and i=imaginary part of the optical index (i=1.5).

The polydispersity index characterizing the width of the distribution is 0.39 for a monodisperse standard of 150 nm.

The mean size of the particles is expressed as mean arithmetic diameter weighted by volume.

7) TG (ThermoGravimetric) Thermal Stability

The thermal decomposition temperature is measured by thermogravimetric analysis (TGA), on films dried at a temperature of 23° C. and at 50% relative humidity for 8 days, using a TG7 device form Perkin-Elmer.

The TGA is carried out under an inert nitrogen atmosphere and with a rise in temperature from 23° C. to 850° C. at a rate of 10° C./min.

8) Chemical Resistance

Evaluation of the chemical resistance to water and to ethanol (48% in water) at 1 hour and at 16 hours according to the standard EN 127120 (spot test).

Application of 2 layers with a nominal thickness of 150 μm to wood (beech veneer) with a bar coater, then intermediate drying at 20° C. and 60% relative humidity (RH) for 16 hours and, finally, sanding.

After drying the 2nd layer at 20° C./60% RH for 24 hours: evaluation of the chemical resistance on a scale from 1 to 5, the higher the value, the better the chemical resistance.

9) Hardness

Evaluation of the pendulum hardness of the films with a nominal thickness of 100 μm applied to glass with an applicator of doctor blade type, according to the Persoz method (standard NF EN ISO 1522), after drying at 20° C. and 60% RH for 24 hours.

10) Mechanical Performances

Tensile Strength:

The tests were carried out on an MTS 1MH tensile testing machine at a temperature of 23° C. and at 50% RH and with a 50 N cell, the rate being 5 mm/min.

DMTA (Dynamic Mechanical Thermal Analysis) Test:

The mechanical tests are carried out on a Rheometrics RSA II device in tension with ramping from −50° C. to 200° C. at 3° C./min and a measurement frequency of 1 Hz.

Films are obtained by application of the emulsions to polypropylene sheets (final thickness of the film: approximately 100 μm), followed by drying at 23° C. and 50% RH for 7 days. Two drops of a wetting agent (Zonyl FSJ) are added to 20 g of emulsion and, in order to avoid any dewetting, the surface of the polypropylene sheets is gently sanded before the application.

EXAMPLE 1 TO 6 AND 8

According to the Invention

A polymer is prepared in aqueous dispersion in a single stage by a emulsion polymerization process with gradual addition of a redox initiator. All the parts mentioned are by weight.

35 parts of deionized water, 2.30 parts of sodium ethoxylated lauryl surface Disponil® FES 993 and an aqueous dispersion of anionic silica nanoparticles stable in a pH range extending from 2 to 10 (see tables 1a and 2) are introduced into a reactor and the reactor is heated to 70° C.±1° C.

A monomer emulsion is prepared by mixing: 1 part of methacrylic acid, 51 parts of butyl acrylate and 48 parts of methyl methacrylate in a solution or 3.33 parts of sodium ethoxylated lauryl sulfate Disponil® FES 993 and 26 parts of deionized water.

When the temperature of the reactor reaches 70° C.±1° C. a solution of 0.07 part of initiator TBHP 70 in 0.82 part of water and a solution of 0.03 part of activator Rongalite® C in 0.82 part of water are added and then, after 5 minutes, the addition of the monomer emulsion and of a solution of 0.64 part of initiator TBHP 70 in 9.40 parts of water and of a solution of 0.27 part of activator Rongalite® C in 9.40 parts of water begins. The monomer emulsion is added in 3 hours and the solution of initiator TBHP 70 and the solution of activator Rongalite® C in 3.5 hours, while maintaining the temperature at 70° C.±1° C.

At the end of the addition, the reactor is maintained at 70° C.±1° C. for an additional 1 hour, before being cooled to 35° C. A 25% ammonium hydroxide solution is added in order to achieve a pH=58, followed by 0.47 part of a preservative Acticide® MES and 0.01 part of an antifoaming agent Byk® 025.

The reactor is subsequently cooled to ambient temperature and the mixture filtered.

EXAMPLE 7

According to the Invention

The operation is carried out exactly as in examples 1 to 6, except as regards the addition of the initiator according to the following conditions.

When the temperature of the reactor reaches 70° C.±1° C., a solution of 0.1 part of initiator VA-086 in 0.82 part of water and a solution of 0.06 part of activator Rongalite® C in 0.82 part of water are added and then, after 5 minutes, the addition of the monomer emulsion and of a solution of 0.9 part of initiator VA-086 in 9.40 parts of water and of a solution of 0.54 part of activator Rongalite® C in 9.40 parts of water begins. The monomer emulsion is added in 3 hours and the solution of initiator VA-086 and the solution of activator Rongalite® C are added in 3.5 hours, while maintaining the temperature at 70° C.±1° C. The other end-of-preparation conditions are identical to those described above for examples 1 to 6.

Results:
They are presented in table 2 below.

do not comprise free silica nanoparticles (very similar values between PCS and LS).

the hybrid dispersions according to the invention result in clear and glossy films, which reflects the absence of silica agglomerates (stability demonstrated).

COUNTEREXAMPLE 1

Comparative

The same procedure as for examples 1 to 6 is repeated but without addition of the dispersion of anionic silica nanoparticles (0% of silica).

COUNTEREXAMPLE 2

(Comparative): with 15% of Ludox® AM

A conventional polymer is prepared in a single stage by an emulsion polymerization process with gradual addition of an inorganic initiator. All the parts mentioned are by weight. 47 parts of deionized water, 2.35 parts of sodium ethoxylated lauryl sulfate Disponil® FBS 993 and 61 parts of an aqueous dispersion of anionic silica nanoparticles Ludox® AM stable at a pH range extending from 2 to 10 are introduced into a reactor and the reactor is heated to 80° C.±1° C.

A monomer emulsion is prepared by mixing 1 part of methacrylic acid, 51 parts of butyl acrylate and 48 parts of methyl methacrylate in a solution of 10 parts of sodium ethoxylated lauryl sulfate Disponil® FES 993 and 37 parts of deionized water.

TABLE 2

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| SiO$_2$ % by weight vs (polym + SiO$_2$) | 5.5 | 10.3 | 15 | 15 | 24 | 30 | 15 | 15 |
| Anionic silica dispersion | Ludox® AM | Ludox® AM | Ludox® AM | Bindzil® 305/220 FG | Ludox® AM | Ludox® AM | Ludox® AM | Levasil® 200A/30 |
| Initiator | TBHP 70 | TBHP 70 | TBHP 70 | TBHP 70 | TBHP 70 | TBHP 70 | VA-086 | TBHP 70 |
| Viscosity (mPa · s) | 19 | 12 | 11 | 16 | 9 | 9 | 8 | 14 |
| Viscosity (mPa · s) 1 month at 50° C. | 20 | 12 | 11 | 16 | 9 | 10 | 10 | 14 |
| Solids content (%) | 42.3 | 42.9 | 41.6 | 43 | 42.9 | 43.5 | 40.1 | 42.9 |
| MFFT (° C.) | 4 | 4 | 3 | 5 | 2 | <0 | 6 | 5 |
| Part. size/PCS (nm) | 111 | 120 | 110 | 116 | 108 | 110 | 154 | 107 |
| P. size/LS-230 (nm) | 102 | 110 | 101 | 103 | 97 | 97 | 141 | 93 |
| Persoz hardness (s) | 83 | 85 | 109 | 110 | 145 | 196 | 105 | 107 |
| Chemical resist. (16 h/water) | 5 | 5 | 5 | 5 | 5 | 5 | 5 | 5 |
| Chemical resist. (1 h/48% ethanol) | 3 | 3 | 5 | 5 | 5 | 5 | 5 | 5 |
| Chemical resist. (16 h/48% ethanol) | 1 | 2 | 3 | 3 | 3-4 | 4 | 3 | 3 |
| Film appearance 100 μm on glass | Clear, glossy | Clear, glossy | Clear, glossy | Clear, glossy | Clear, glossy | Clear, glossy | Clear, glossy | Clear, glossy |

It may concluded that:
- the hybrid dispersions of examples 1 to 8 are stable in the long term without increase in the viscosity after month 1 at 50° C.
- the measurement of the size of the particles of the dispersions of examples 1 to 8, carried out by virtue of PCS and LS (different selective techniques), indicates that they When the temperature of the reactor reaches 80° C.±1° C., 0.5 part of sodium persulfate, as initiator, and 0.82 part by weight of water are added in the form of a solution and then, after 5 minutes, the addition of the monomer emulsion and of 0.45 part of sodium persulfate initiator and of 10.6 parts of water in the form of a solution is began. The addition of the monomer emulsion is carried out in 3 hours and that of the solution of sodium persulfate initiator in 3.5 hours, while maintaining the temperature at 80° C.±1° C.

On Completion of the addition, the reactor is maintained at 80° C.±1° C. for an additional 1 hour, before being cooled to 35° C. A 25% ammonium hyhdroxide solution is added in order to achieve a pH=7.5-8, followed by 0.47 part of an activator Acticide® MES and 0.0 part or an antifoaming agent Byk®R 025.

The reactor is subsequently cooled to ambient temperature and the mixture filtered.

COUNTEREXAMPLE 3

(Comparative): 15% of Klebosol®C 30 R 12 Silica (without Al and Unstable in the pH Range Extending from 2 to 10)

The same procedure as for examples 1 to 6 is repeated bat replacing the dispersion Ludox® AM with an aqueous dispersion of silica nanoparticles Klebosol® 30 R 12, which does not meet the criterion of stability in the pH range extending from 2 to 10 (aluminum Al=0, absence of modification by Al, see table 1a).

The dispersion obtained is unstable and agglomerates during cooling.

Results:

They are presented in table 3 below.

TABLE 3

|  | Counterex. 1 | Counterex. 2 | Counterex. 31 |
|---|---|---|---|
| % SiO$_2$/total solid | 0 | 15 | 15 |
| Initial viscosity (mPa · s) | 55 | 46 | — (gel) |
| Viscosity (mPa · s) after 1 month at 50° C. | 157 | >120 000 | — (gel) |
| Solids content (%) | 42.8 | 42.8 | — |
| MFFT (° C.) | 2 | 2 | — |
| PCS size of the particles (nm) | 84 | 62 | — |
| LS-230 size of the particles (nm) | 87 | 112 | — |
| Persoz hardness (s) | 42 |  |  |
| Chemical resistance (16 hours in water) | 5 |  |  |
| Chemical resistance (1 hour in 48% ethanol) | 3 |  |  |
| Chemical resistance (16 hours in 48% ethanol) | 1 |  |  |

It may be concluded that:

According to the interpretation of measurement of the size of the particles of the dispersion of counterexample 2, carried out by virtue of two different selective techniques (PCS and LS), the silica nanoparticles are free and do not form nanocomposite particles with organic polymer The viscosity greatly increases at ambient temperature, whilst demonstrating the instability of the dispersion.

Evaluation of the Mechanical Performances (Table 4 Below):

TABLE 4

|  |  |  | DMTA test |  |  | Tensile strength | | |
|---|---|---|---|---|---|---|---|---|
|  | SiO$_2$/ (pol + silica) % | Initiator | T$_g$ (C.) | Tan δ | E' modulus 100° C. (MPa) | Elongation at break (%) | Breaking stress (MPa) | Young's modulus (MPa) |
| Ex. 1 | 5.5 | TBHP 70 | 34 | 1.95 | flow | 635 | 3.2 | 12 |
| Ex. 2 | 10.3 | TBHP 70 | 33 | 1.22 | 2.6 | 577 | 4.0 | 14 |
| Ex. 3 | 15 | TBHP 70 | 28 | 0.87 | 4.0 | 617 | 3.6 | 16 |
| Ex. 4 | 15 | TBHP 70 | 34 | 1.01 | 6.5 | 405 | 6.8 | 73 |
| Ex. 5 | 24 | TBHP 70 | 25 | 0.42 | 170 | 446 | 5.6 | 141 |
| Ex. 6 | 30 | TBHP 70 | 26 | 0.27 | 380 | 317 | 7.7 | 351 |
| Ex. 7 | 15 | VA-086 | 34 | 0.89 | 10.0 | 311 | 5.8 | 77 |
| Ex. 8 | 15 | TBHP 70 | 31 | 1.11 | 2.8 | 519 | 3.8 | 34 |
| Counter ex 1 | 0 | TBHP 70 | 34 | 2.71 | flow | 712 | 2.9 | 7 |

EXAMPLES 9 TO 11

According to the Invention

These examples illustrate the effect of the presence of acetoacetoxyethyl methacrylate (AAEM) in the monomer composition.

The procedure remains the same as for examples 1 to 6 but while modifying the composition of the monomer mixture according to table 5 below and with a level of SiO$_2$/overall solids content (polymer+silica) equal to 9%.

TABLE 5

| Monomers | Ex. 9 | Ex. 10 | Ex. 11 |
|---|---|---|---|
| Acetoacetoxyethyl methacrylate (AAEM) | 0 | 5 | 10 |
| Butyl acrylate (BuA) | 51 | 49 | 46 |
| Methyl methacrylate (MMA) | 48 | 45 | 43 |
| Methacrylic acid (MAA) | 1 | 1 | 1 |

Results: See Table 6 Below.

TABLE 6

|  | Ex. 9 | Ex. 10 | Ex. 11 |
|---|---|---|---|
| % SiO$_2$/overall solids content | 9 | 9 | 9 |
| % Acetoacetoxyethyl methacrylate (AAEM) | 0 | 5 | 10 |
| Type of anionic dispersion of silica nanoparticles | Ludox ® AM | Ludox ® AM | Ludox ® AM |
| Type of initiator | TBHP 70 | TBHP 70 | TBHP 70 |
| Viscosity (mPa · s) | 20 | 17 | 17 |
| Viscosity (mPa · s) after 1 month at 50° C. | 20 | 17 | 17 |
| Solids content (%) | 43.4 | 43.2 | 42.8 |
| MFFT (° C.) | 5 | 5 | 7 |
| PCS size of the particles (nm) | 96 | 105 | 106 |
| LS-230 size of the particles (nm) | 97 | 106 | 107 |
| Appearance of 100 µm film on glass | clear, glossy | clear, glossy | clear, glossy |

Evaluation of the Mechanical Performances: See Table 7 Below

TABLE 7

|  |  | DMTA test | | E' | Tensile strength | | |
|---|---|---|---|---|---|---|---|
|  | SiO$_2$ % by weight (polym + silica) | % AAEM | T$_a$ (° C.) | Tan δ | modulus 100° C. (MPa) | Elongation at break (%) | Breaking stress (MPa) | Young's modulus E (MPa) |
| Ex. 9 | 9 | 0 | 32 | 1.7 | 0.48 | 596 | 4.0 | 23 |
| Ex. 10 | 9 | 5 | 35 | 1.5 | 1.20 | 435 | 4.9 | 34 |
| Ex. 11 | 9 | 10 | 38 | 1.5 | 1.30 | 401 | 5.3 | 50 |

Figure 1:
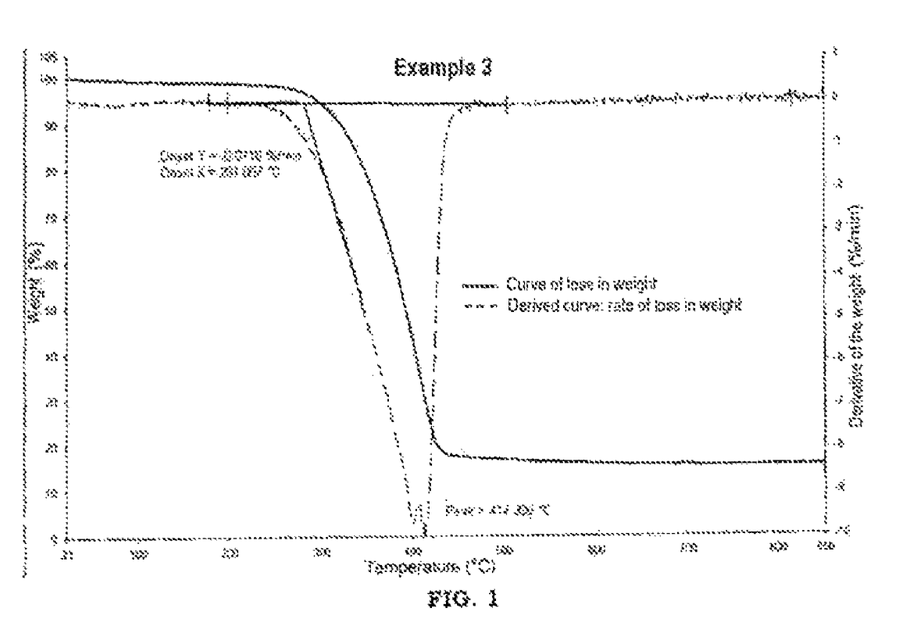
FIG. 1 corresponds to the evaluation of the TGA (Thermal Gravimetric Analysis) thermal stability of the aqueous polymer dispersion described in example 3.
Figure 2:
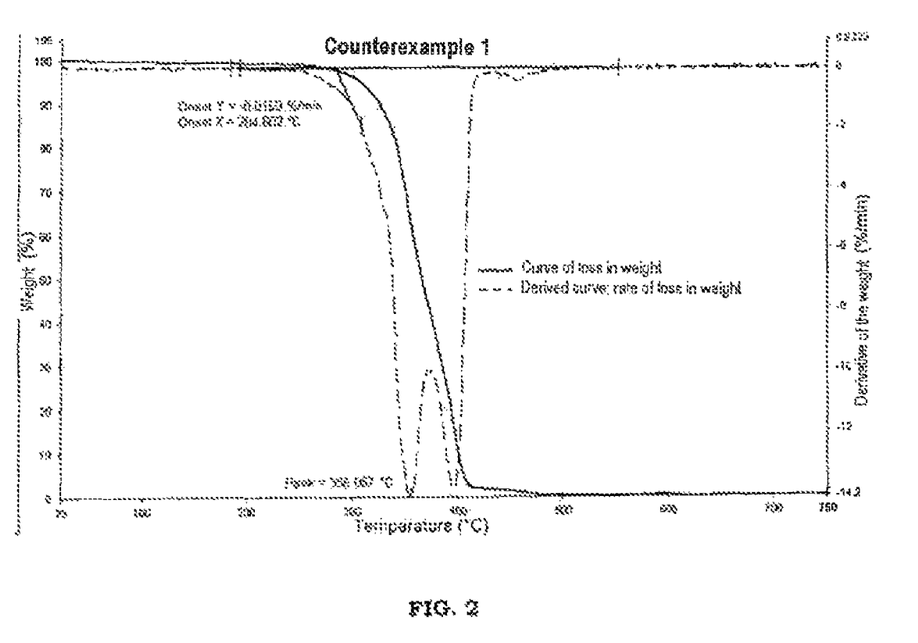
FIG. 2 corresponds to the evaluation of the TGA thermal stability of the aqueous polymer dispersion described in counterexample 1.
Figure 3:
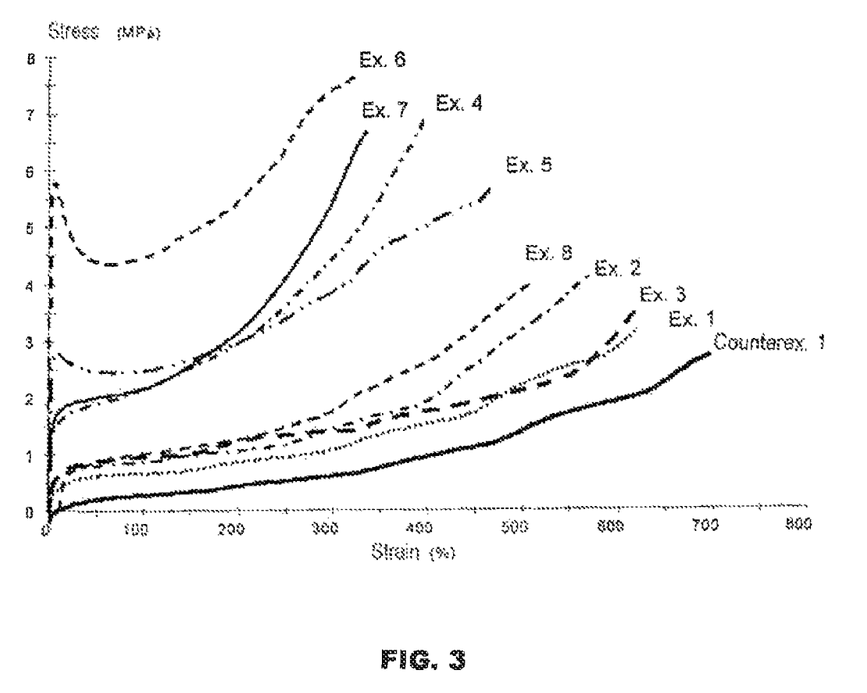
FIG. 3 represents the variation in the stress as a function of the strain (stress/strain curve) of films resulting from aqueous polymer dispersions described in examples 1 to 8 and in counterexample 1.
Figure 4A:
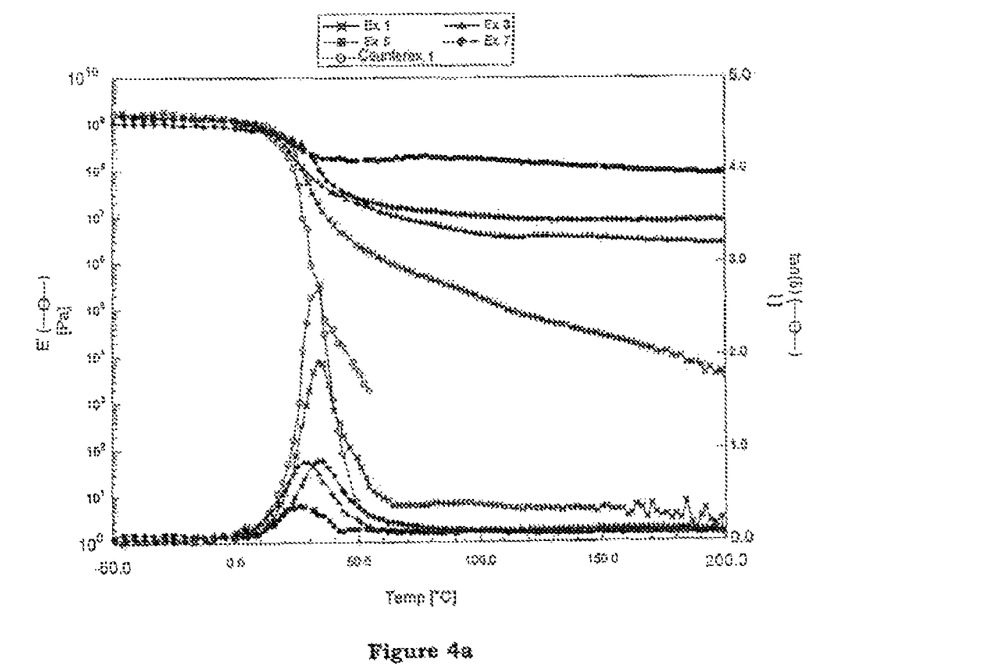
FIGS. 4a and 4b represent the variation in the elastic modulus E' and in the tan δ as a function of the temperature (DMTA curves) of films resulting from aqueous polymer dispersions described in examples 1 to 8 and in counterexample 1.
Figure 4B:
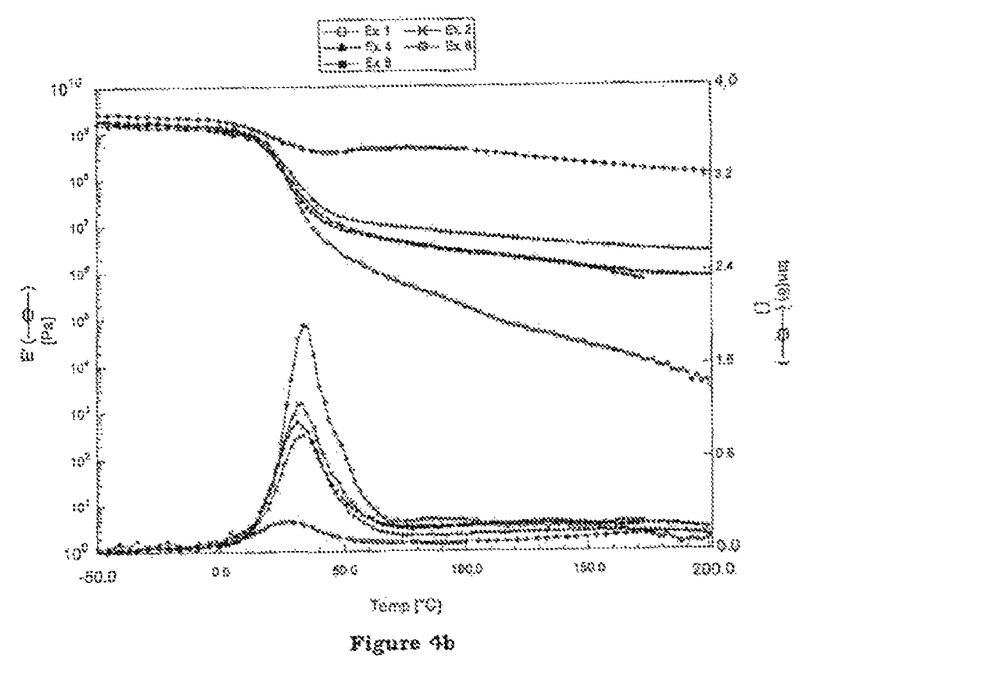
Figure 5:
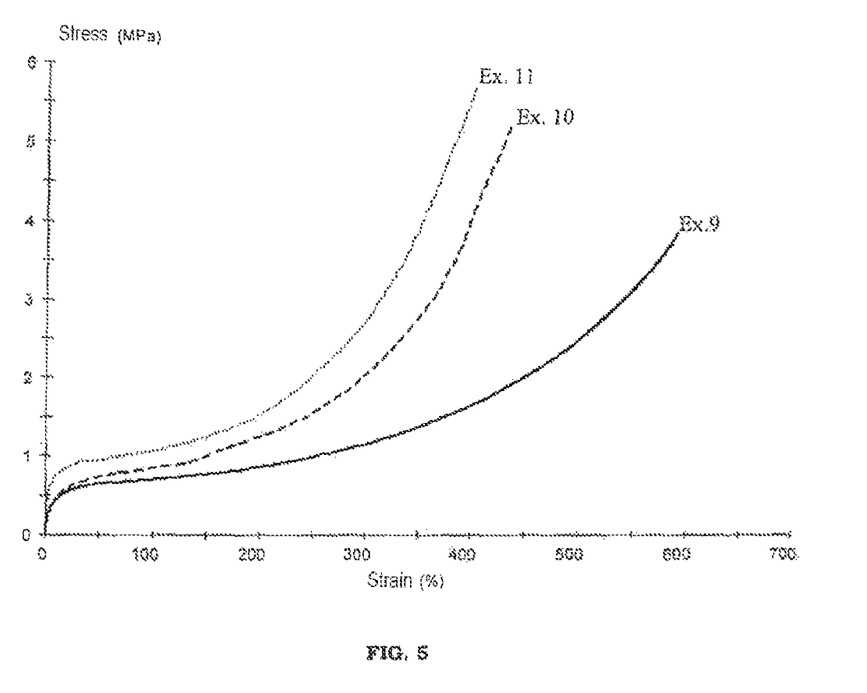
FIG. 5 represents the variation in the stress as a function of the strain (stress/strain curve) of films resulting from aqueous polymer dispersions described in examples 9 to 11.
Figure 6:
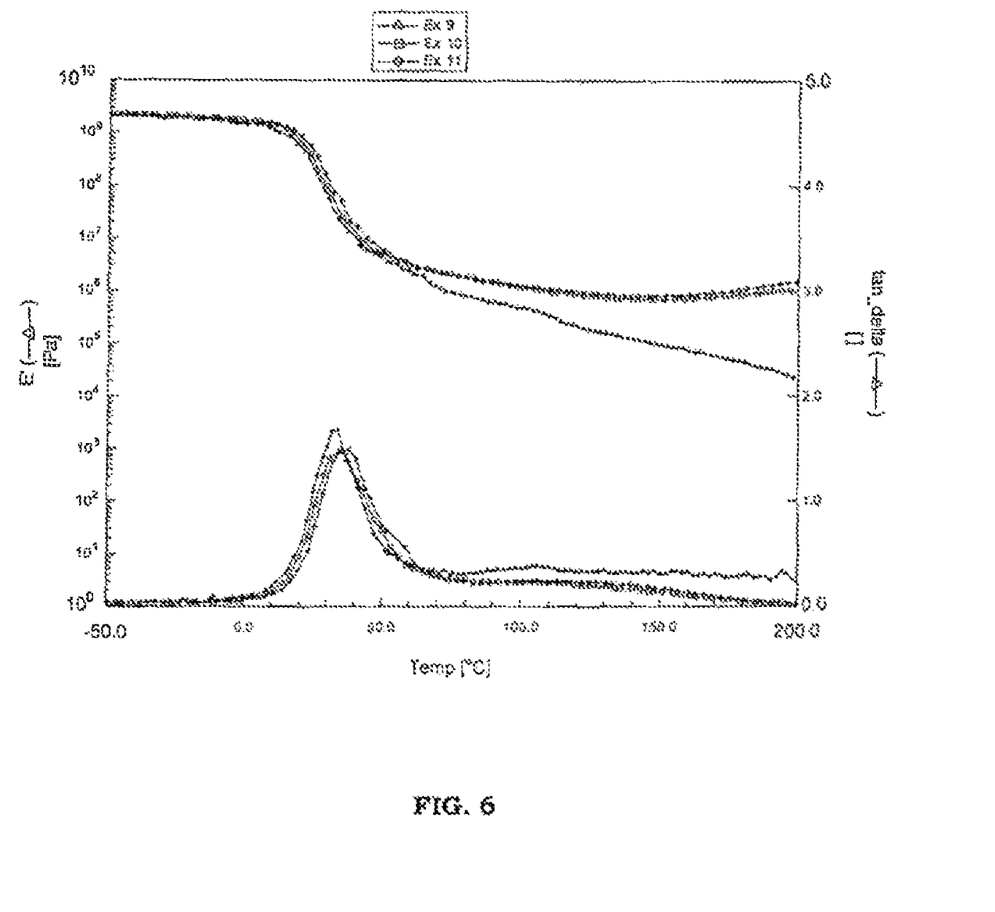
FIG. 6 represents the variation in the elastic modulus E' and in the tan δ as a function of the temperature (DMTA curves) of the aqueous polymer dispersions described in examples 9 to 11.

What is claimed is:

1. An aqueous nanocomposite polymer dispersion obtained by emulsion polymerization of at least one monomer composition in the presence of at least one aqueous dispersion of silica nanoparticles, characterized in that:
said monomer composition is added, in at least one stage, to the reactor already comprising the aqueous dispersion of silica nanoparticles which is devoid of any cationic organic compound from monomers or dispersants or initiators which can function as stabilizers of said silica nanoparticles,
said initial aqueous dispersion of silica nanoparticles:
is based on anionic nanoparticles of silica modified with aluminum and devoid of any coupling agent,
is stable in a pH range extending from 2 to 10, which stability is expressed in terms of absence of aggregates and/or agglomerates and/or sedimentation, said emulsion polymerization is carried out in the presence of at least one organic initiator system free from any ionic group and in the absence of cationic monomers, initiators or dispersants.

2. The dispersion as claimed in claim 1, characterized in that the degree by weight of modification of the nanosilica by the aluminum corresponds to SiO$_2$/Al$_2$O$_3$ ranging from 80/1 to 240/1.

3. The dispersion as claimed in claim 1, characterized in that said dispersion is stable in terms of absence of gelling during the reaction or the storage or the use.

4. The dispersion as claimed in claim 1, characterized in that the nanocomposite polymer particles have a core/shell structure.

5. The dispersion as claimed in claim 1, characterized in that the size of said silica nanoparticles varies from 5 to 50 nm.

6. The dispersion as claimed in claim 1, characterized in that the final size of the particles of said dispersion varies from 50 to 500 nm.

7. The dispersion as claimed in claim 1, characterized in that the overall solids content of said dispersion varies from 10 to 65% by weight.

8. The dispersion as claimed in claim 1, characterized in that the ratio by weight of the silica to the overall solids content varies from 0.1 to 60%.

9. The dispersion as claimed in claim 1, characterized in that said monomer composition comprises up to 50% by weight of acetoacetoxyethyl methacrylate.

10. The dispersion as claimed in claim 9, characterized in that said monomer composition comprises from 0.1 to 25% by weight of acetoacetoxyethyl methacrylate.

11. The dispersion as claimed in claim 1, characterized in that it has been modified by postaddition of at least one organosilane compound at up to 10 mmol per g of nanosilica.

12. A process for the preparation of a dispersion as claimed in claim 1, characterized in that said process comprises at least the following stages:
i) addition to a polymerization reactor of at least one dispersion of nanoparticles of anionic silica modified with aluminum which is stable in a pH range extending from 2 to 10,
ii) continuous or semicontinuous addition of a monomer composition in at least one stage, iii) polymerization of the reaction mixture resulting from stages i) and ii) in the presence of at least one organic initiator system free from any ionic group.

13. The process as claimed in claim 12, characterized in that the polymerization reaction mixture is stable in terms of absence of gelling during the reaction.

14. The process as claimed in claim 12, characterized in that the initiator system is added either with the monomer composition or separately.

15. The process as claimed in claim 12, characterized in that the polymerization comprises at least two stages.

16. The process as claimed in claim 15, characterized in that the monomer composition of the 1st stage is different from the monomer composition of the 2nd stage.

17. The process as claimed in claim 12, characterized in that the monomer composition is chosen so as to be able to obtain nanocomposite polymer particles having a core/shell structure.

18. The process as claimed in claim 12, characterized in that it comprises a stage of use of at least one aqueous polymer dispersion as seed, before the addition of said monomer composition.

19. A process for the preparation of a dispersion as claimed in claim 1, characterized in that said process comprises at least the following stages:
   i) addition to a polymerization reactor of at least one dispersion of nanoparticles of anionic silica modified with aluminum which is stable in a pH range extending from 2 to 10,
   ii) addition of the polymer dispersion of claim 1 as seed,
   iii) continuous or semicontinuous addition of a monomer composition in at least one stage,
   iv) polymerization of the reaction mixture resulting from stages i), ii) and iii) in the presence of at least one organic initiator system free from any ionic group.

20. The process as claimed in claim 12, characterized in that it comprises an additional stage of postaddition, after emulsion polymerization, at up to 10 mmol per g of nanosilica, of at least one organosilane compound.

21. A coating composition, characterized in that it comprises at least one dispersion as defined according to claim 1.

22. The coating composition as claimed in claim 21, characterized in that it is a protective coating composition.

23. The coating composition as claimed in claim 21, characterized in that it is selected from paints or varnishes or inks or adhesives.

24. The method of using of the dispersion as defined according to claim 1 by adding the dispersion to coating compositions.

25. The method of using as claimed in claim 24, characterized in that it is the use of protective coating for wood or of decorative coating on glass.

26. A coating composition, characterized in that it comprises at least one dispersion obtained according to a process as defined according to claim 12.

27. The method of using the dispersion as defined according to claim 1 by adding the water-dispersible nanocomposite polymer as a seed in the preparation of specific structured latexes.

28. The method of using the dispersion obtained according to a process as defined in claim 12 by adding the dispersion to coating compositions.

29. The method of using the dispersion obtained according to a process as defined in claim 12 by adding a water-dispersible nanocomposite polymer as a seed in the preparation of specific latexes.

* * * * *